United States Patent
Subramanian (10) Patent No.: US 7,693,146 B2
(45) Date of Patent: Apr. 6, 2010

(54) METHOD AND SYSTEM FOR FILTERING TRAFFIC FROM UNAUTHORIZED SOURCES IN A MULTICAST NETWORK

(75) Inventor: Srinivas Subramanian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1000 days.

(21) Appl. No.: 11/373,476

(22) Filed: Mar. 10, 2006

(65) Prior Publication Data

US 2007/0211722 A1   Sep. 13, 2007

(51) Int. Cl.
H04L 12/28   (2006.01)

(52) U.S. Cl. ....................................... 370/390

(58) Field of Classification Search .................. 370/351, 370/389, 390
See application file for complete search history.

(56) References Cited

U.S. PATENT DOCUMENTS 6,597,703 B1 * 7/2003 Li et al. ....................... 370/428

OTHER PUBLICATIONS

Dalal et al, Reverse Path Forwarding of Broadcast Packets, Communications of the ACM, vol. 21, Issue 12, Dec. 1978.*
Qian et al, ACLA: A Framework for Access Control List (ACL) Analysis and Optimization, Communications and Multimedia Security, 2001.*
Role-Based Access Controls; 15th National computer Security Conference, 1992; pp. 554-563.*
S. Deering, RFC 1112—"Host Extensions for IP Multicasting", Aug. 1989.
W. Fenner, RFC 2236—"Internet Group Management Protocol, Version 2", Nov. 1997.
D. Estrin et al., RFC 2362—"Protocol Independent Multicast-Sparse Mode (PIM-SM): Protocol Specification", Jun. 1998.
A. Adams et al., RFC 3973, Protocol Independent Multicast-Dense Mode (PIM-DM): Protocol Specification (Revised), Jan. 2005.

* cited by examiner

*Primary Examiner*—Pankaj Kumar
*Assistant Examiner*—Gautam Sharma
(74) *Attorney, Agent, or Firm*—Cindy Kaplan (57) ABSTRACT

A method and system for filtering traffic in a multicast network are disclosed. Multicast packets are received at a network device which has a multicast routing table and a list containing nodes or interfaces authorized for transmitting multicast traffic into the network at the network device. The method includes determining if the network device is directly connected to a source of the multicast packet and only if the network device is directly connected to the source of the multicast packet, checking the list to determine if the source is an authorized source and dropping or blocking multicast packets from the source if the source is not an authorized source. The method further includes processing multicast packets from the source according to the multicast routing table.

25 Claims, 5 Drawing Sheets

METHOD AND SYSTEM FOR FILTERING TRAFFIC FROM UNAUTHORIZED SOURCES IN A MULTICAST NETWORK

BACKGROUND OF THE INVENTION

The present invention relates generally to communication networks, and more specifically, to filtering traffic from unauthorized sources in a multicast network.

Traditional Internet Protocol (IP) communication allows a host to send packets to a single host (unicast transmission) or to all hosts (broadcast transmission). To support a demand to provide applications such as audio and video conference calls, audio broadcasting, and video broadcasting that involve high data rate transmission to multiple hosts, a third routing technique has evolved, multicast routing. In multicast routing, a host sends packets to a subset of all hosts as a group transmission. Multicast routing protocols have been developed to conserve bandwidth by minimizing duplication of packets. To achieve maximum efficiency delivery of data, rather than being replicated at the source, multicast packets are replicated in a network at the point where paths to multiple receivers diverge.

In large part, multicast routing protocols rely on the same underlying Internet infrastructure that supports unicast routing. One key difference is that whereas unicast routing is generally based on a destination IP address of the packet, multicast routing protocols typically make forwarding decisions based on a group address that identifies a group of intended recipients and possibly also on an address of the packet source.

A multicast group is an arbitrary group of receivers that expresses an interest in receiving a particular datastream. Such a group has no physical or geographical boundaries. Hosts that are interested in receiving data flowing to a particular group join the group using Internet Group Management Protocol (IGMP). An IP multicast address, or a portion thereof, specifies a particular group.

Multicast-capable routers create distribution trees that control the path that IP multicast traffic takes through the network in order to deliver traffic to all receivers. The two basic types of multicast distribution trees are source trees and shared trees.

In a source tree, the multicast traffic source is the root and the branches form a spanning tree through the network to the receivers. This is also referred to as a shortest path tree (SPT) because the tree typically uses the shortest paths between the source and receiver through the network. A particular SPT is denoted by a (S,G) address where S is the IP address of the source and G is the group address of the group of recipients.

Unlike source trees that have their root at the source, shared trees use a single common root placed at some chosen point in the network. This shared root is called a Rendezvous Point (RP). Because all sources of traffic directed to a particular multicast group use a common shared tree, shared trees are identified by addresses written in (*,G) form. In this wildcard notation, * denotes all sources, and G represents the multicast group.

In multicast networks, any host can start forwarding multicast data traffic into the network. The multicast network may therefore be used to generate a multicast DoS (Denial of Service) attack, in which an attacker makes a system unresponsive by forcing it to handle sham requests that consume all available resources. A compromised or unauthorized host can transmit multicast data traffic containing spurious data to a multicast group address and port number to which there may be one or more legitimate sources forwarding multicast data traffic. If the multicast traffic that is being sent is high bandwidth traffic, it may significantly degrade the performance of the network and also the performance of the hosts that are interested in receiving traffic for that particular multicast group.

Conventional methods for preventing unauthorized hosts from forwarding multicast data traffic include the configuration of filters in the form of access control lists or route-maps on the routers or rendezvous point (RP) lists on the rendezvous points. However, if filter lists are used, the lists must be configured on all multicast enabled routers that have directly connected hosts to block a particular host or a set of hosts from forwarding multicast data traffic on a per interface basis. For example, in a network configured for PIM (Protocol Independent Multicast) dense mode with one fixed known source and a thousand receivers, there is no easy solution to block the thousand receivers from each becoming a multicast source without configuring filters on each router's interface on which there is one or more directly connected hosts. If RP lists are used, a portion of the network is still affected as the unwanted traffic travels all the way to the RP and then gets filtered at the RP.

SUMMARY OF THE INVENTION

A method and system for filtering traffic in a multicast network are disclosed. Multicast packets are received at a network device which has a multicast routing table and a list containing nodes or interfaces authorized for transmitting multicast traffic into the network at the network device. In one embodiment of the invention, a method generally comprises determining if the network device is directly connected to a source of the multicast packet and only if the network device is directly connected to the source of the multicast packet, checking the list to determine if the source is an authorized source and dropping or blocking multicast packets from the source if the source is not an authorized source. The method further includes processing multicast packets from the source according to the multicast routing table.

An apparatus for filtering traffic in a multicast network comprises memory for storing a multicast routing table and a list containing nodes or interfaces authorized for transmitting multicast traffic into the network at a network device. The apparatus further comprises a processor operable to receive a multicast packet at the network device, determine if the network device is directly connected to a source of the multicast packet, only if the network device is directly connected to the source of the multicast packet, check the list to determine if the source is an authorized source and drop or block multicast packets from the source if the source is not an authorized source, and process multicast packets according to the multicast routing table.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A system and method of the present invention reduce the risk of unauthorized hosts forwarding multicast data traffic in multicast enabled networks. As described in detail below, the method and system prevent unwanted sources from forwarding multicast data traffic by using reverse path forwarding (RPF) information for a source and thereby preventing multicast DoS (Denial of Service) attacks in the network.

The present invention operates in the context of a data communication network including multiple network elements. Some of the elements in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. When acting under the control of appropriate software or firmware, a processor is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software.

Figure 1A:
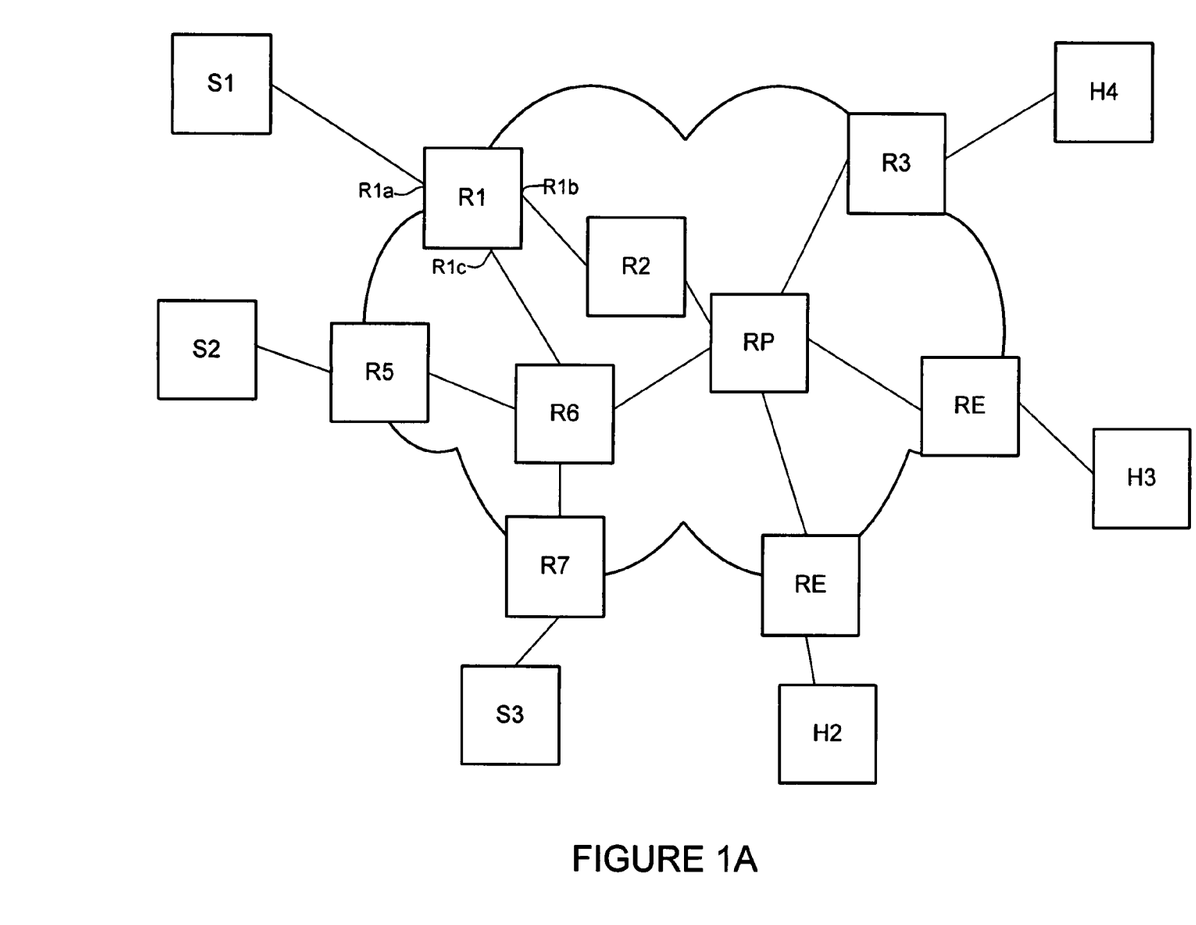
FIG. 1A illustrates a network in which the present invention may be implemented.

FIG. 1A illustrates an exemplary multicast network in which the present invention may be implemented. The network includes a plurality of network devices, including edge routers RE, R1, R3, R5, R7 and core routers R2, R6, RP. RP may be a rendezvous point if the network is configured for sparse mode. S1, S2, and S3 are hosts acting as multicast sources and H2, H3, and H4 are multicast receivers which are in communication with the network via the edge routers. An example of a path on the network is from source S1 to destination H4 and passing through R1, R2, RP, and R3. In this path, R1 is a first-hop router from source S1 and is directly connected to source S1. Each router includes one or more interfaces. For example, R1 has three interfaces R1a, R1b, and R1c. It is to be understood that the network shown in FIG. 1A is only one example and that the method and system described herein can be used in networks having various configurations and any number of network devices.

As previously discussed, IP multicast is used to simultaneously deliver a single stream of information to numerous recipients. Multicast packets are replicated in a network at the point where paths diverge to achieve efficient data delivery to multiple receivers. PIM (Protocol Independent Multicast) may be used to dynamically create a multicast distribution tree to ensure distribution to intended receivers while limiting distribution so that network segments that are not in the path between the source and receivers are not burdened with unnecessary traffic. The present invention is described with reference to the implementation of PIM but is not limited to this particular multicast protocol suite.

In multicast forwarding a source sends traffic to an arbitrary group of hosts that are represented by a multicast group address. The multicast address may be an (S,G) address, where S is the IP address of the source and G is the group address, or the address may be in the form (*,G), where * denotes all sources. The multicast router must determine which direction is the upstream direction (towards the root of the tree), and which one is the downstream direction (or directions). If there are multiple downstream paths, the router replicates the packet and forwards it down the appropriate downstream paths based on receiver interest. Forwarding multicast traffic away from the root, rather than to the receiver, is called Reverse Path Forwarding (RPF). RPF makes use of the existing unicast routing table to determine the upstream and downstream neighbors and identifies a path from a receiver or intermediate node back to the tree root. Packets received via this path from the tree root are eligible for further forwarding downstream. Packets received on other interfaces not connected to this path will not be forwarded and their receipt is referred to as RPF failure.

To identify the correct reverse path, PIM can exploit a wide variety of unicast routing protocols including Enhanced Interior Gateway Routing Protocol (EIGRP), Open Shortest Path First (OSPF), Border Gateway Protocol (BGP), etc. PIM typically uses the unicast routing tables developed by such unicast routing protocols to perform the RPF function rather than constructing an independent multicast routing table.

There are a variety of PIM forwarding modes including PIM Dense Mode, PIM Sparse Mode and Bi-Directional PIM. The present invention may be used with any of these modes. Source-Specific Multicast (SSM) is also accommodated by embodiments of the present invention.

Figure 1B:
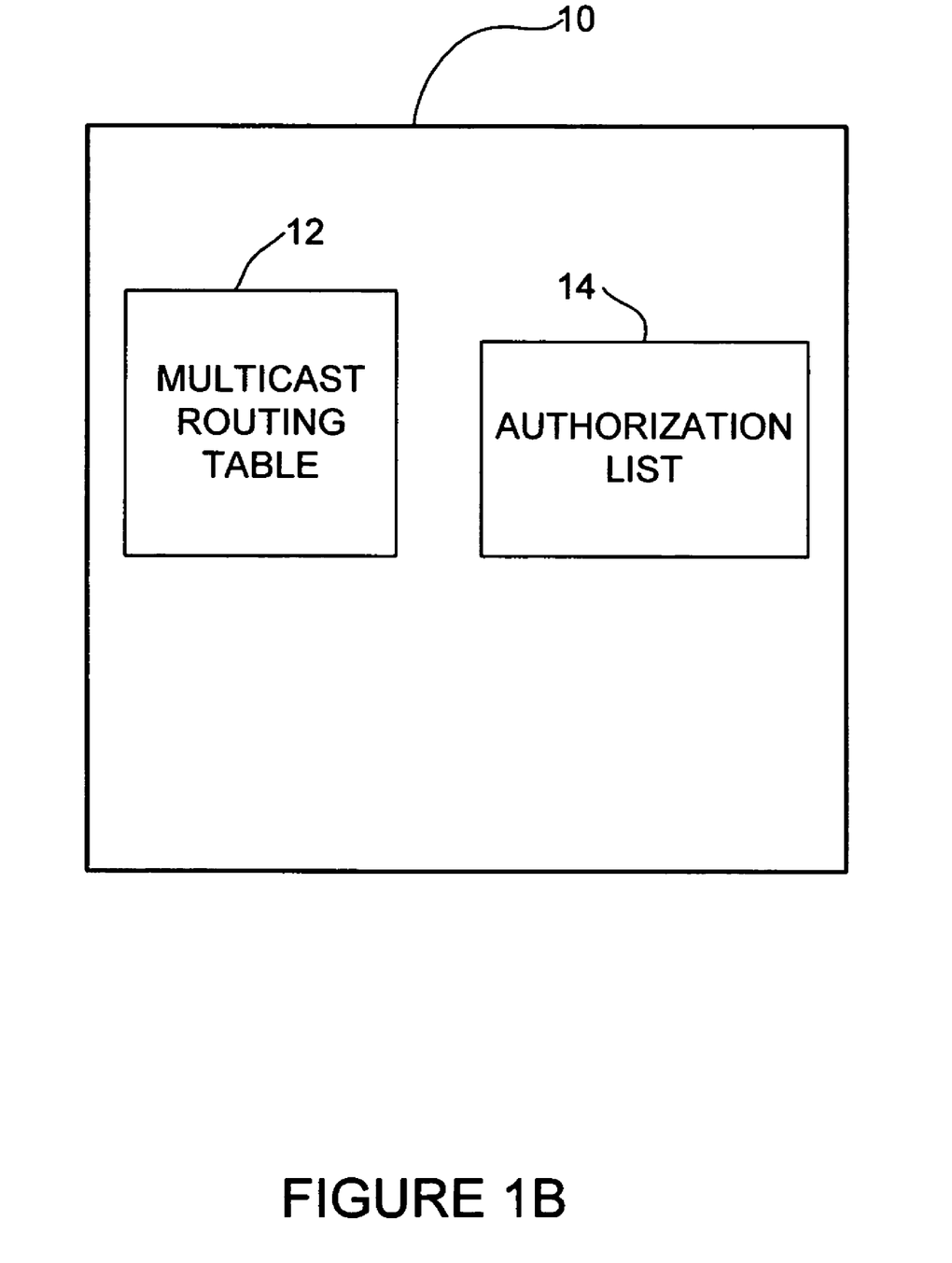
FIG. 1B is a block diagram of a network device of the network of FIG. 1A.

In order to support multicast routing operations, each router 10 maintains a multicast routing (or forwarding) table 12 which includes route states (FIG. 1B). The table is referred to herein as an mroute (multicast route) table and entries for the table are referred to mroute entries. A multicast routing state transition scheme is used to determine the disposition of each received multicast packet. For example, a given multicast packet can be forwarded, dropped, preserved, or copied to a host application, as needed. Entries within the table may have one or more flags set, as described below.

The multicast forwarding state on the routers is data traffic driven, therefore the forwarding state on the routers is created only when a source starts forwarding multicast data traffic to a multicast group. Before a router forwards multicast data traffic to a list of outgoing interfaces on which either a PIM join or an IGMP membership report was received for that particular group, it first does an RPF lookup using the routing table to confirm if the interface on which the multicast data traffic was received is the interface used to reach the source in unicast. This controls which hosts are eligible to forward multicast traffic.

In the case of first-hop routers from the source, a valid RPF check indicates the directly connected interface to the source, which can be readily obtained from the routing table. In the case of a router which is not a first-hop router, a valid RPF check points to a routing table entry with a next hop. That entry in the routing table is not a directly connected interface to the source.

The first-hop routers include a filter list of multicast source IP addresses or interfaces and destination multicast group addresses configured through which multicast data traffic can enter into the network. The list is used to determine whether the multicast sources, which have passed the RPF checks and point to directly connected interfaces, are legitimate or authorized sources for forwarding multicast packets to that group. Thus, checking the configured list prevents unwanted sources from forwarding multicast data traffic into the network.

The following is an example of a command that can be used to configure a multicast authorization (filter) list 14 (FIG. 1B) of IP addresses or a list of interfaces on which valid sources are present:

ip multicast source [list <acl>|route-map <map-name>|<interface-list>]

The ACL (Access Control List) or route-map may denote, for example, a specific source and a group or a specific set of sources and groups, or just the source or the subnet using wildcard masks in the ACL. In one embodiment, the list may be configured in global configuration mode. This allows one configuration command to activate the filter across all multicast interfaces. The list is referred to herein as a "Global ACL", however, it is to be understood that the list may also be an RP list or any other suitable list which specifies authorized source nodes or interfaces. As discussed below, the list is preferably duplicated on all or at least a portion of the routers in the multicast network.

The following are examples of rules that may apply to the configuration command:

"no ip multicast source"—no host that is directly connected to this router can become a multicast source.

"ip multicast source"—If no list, route-map, or list of interfaces is specified, then any directly connected host on the router can become a multicast source. This may be a default command.

"ip multicast source [list <acl>|route-map <map-name>|<interface-list>]—the configured sources in the ACL, route-map, or interface are applied as specified in the list.

The following additional rules may be used to govern the creation of multicast state information on the routers. These rules are applied after the multicast data from source S to group G enters the incoming interface and after the RPF check is successful, but before creation of the multicast state information in the multicast routing table.

If the RPF check for the source is successful and it points to a directly connected interface, then the following rules may be configured to apply:

"no ip multicast source"—packet is dropped.

An (S,G) entry may be created to redirect the traffic to NULL interface for black holing the traffic and the (S,G) entry can have a flag (e.g., "B flag") set to indicate that it is blocked. Creation of state with B flag set also helps in tracking hosts that are forwarding unwanted multicast data traffic.

"ip multicast source"—creation of multicast state information on the router is allowed.

"ip multicast source [list <acl>|route-map <map-name>|<interface-list>]—creation of multicast state information depends on the configured filter list and if permitted, then the multicast state information is created and traffic forwarded or else an (S,G) entry is created with B flag set and traffic is black holed by redirecting it to NULL interface.

If the RPF check points to an interface that is not directly connected or to a pseudo directly connected interface such as a multicast tunnel interface, or there is no RPF information for the source, then the above filter list command even if configured is not used to check for the creation of multicast state information. In this case, the multicast state information creation or data traffic forwarding is carried out according to existing rules. The command is also ignored for all multicast routing plane traffic such as PIM protocol messages and multicast traffic destined to Auto-RP groups.

The rules set forth above allow multicast data traffic from unwanted or unauthorized sources to be effectively blocked at the first-hop router and hence protect the network from multicast data DoS attacks.

The configuration of eligible multicast sources can be further carried out dynamically using role based ACLs or policy based ACLs if the network uses a server based authentication and authorization mechanism such as TACACS (Terminal Access Controller Access Control System) or RADIUS (Remote Authentication Dial-In User Service) and a policy server. The method and system described above may then be used in many to one or many to many multicast networks, such as multicast gaming networks, where a set of users, each having the capability of becoming a source, could be added to a separate user group. The policy server on notification of the group the user belongs to, can then derive the ACLs applicable from the policy applied for that group and configure the respective first-hop routers multicast filter ACL list. This also obviates the need for manual configuration and maintenance of eligible sources on the first-hop routers.

As noted above, the method and system described herein utilize a global ACL that can be applied on all routers (e.g., edge and core routers). The router checks to see whether the source is directly connected, and if it is directly connected, the global ACL is applied and a multicast forwarding state is created in the multicast route table to forward or deny the rest of the multicast packets. If the source is not directly connected, it ignores the global ACL and creates the multicast forwarding entry.

With conventional interface ACL, every packet that comes into the router is subjected to the interface ACL and either permitted or dropped. Thus, interface ACL is used to either permit or drop the multicast packet, whereas global ACL is used to create the multicast state information in the mroute table in such a way to either permit or drop the packets using the first multicast packet and the rest of the multicast packets from the same source destined to the same multicast group will get either forwarded or dropped depending on the multicast entry that was created by the first packet.

Since the multicast forwarding state creation is data driven, the first packet needs to be seen by the process level for creating the mroute entry in the mroute table. The rest of the packets are forwarded based on this mroute entry. Some network devices may cache the mroute state in a fast path and forward the rest of the packets sent to the same (S,G) in the fast (interrupt) path. Other network devices may program the (S,G) entry in hardware and forward the rest of the packets to the same (S,G) in hardware.

With global ACL, only the first multicast packet which comes to the process level for creating the mroute entry is subjected to the global ACL check. If the source is not directly connected, the global ACL is ignored. If it is a directly connected source, and if the global ACL permits the (S,G), then an (S,G) entry is created in the mroute table and forwarding of the rest of the packets sent to the same (S,G) takes place either in the fast path or in the hardware, depending on the capability of the network device.

If the global ACL denies the (S,G), then the mroute entry can still be created in the routing table with the OIF (outgoing interfaces) list set to NULL and a flag (B) set to indicate that this mroute entry is for dropping the packets. Then, the rest of the packets sent to the same (S,G) will be dropped in the fast path or in hardware, depending on the capability of the network device.

Figure 2:
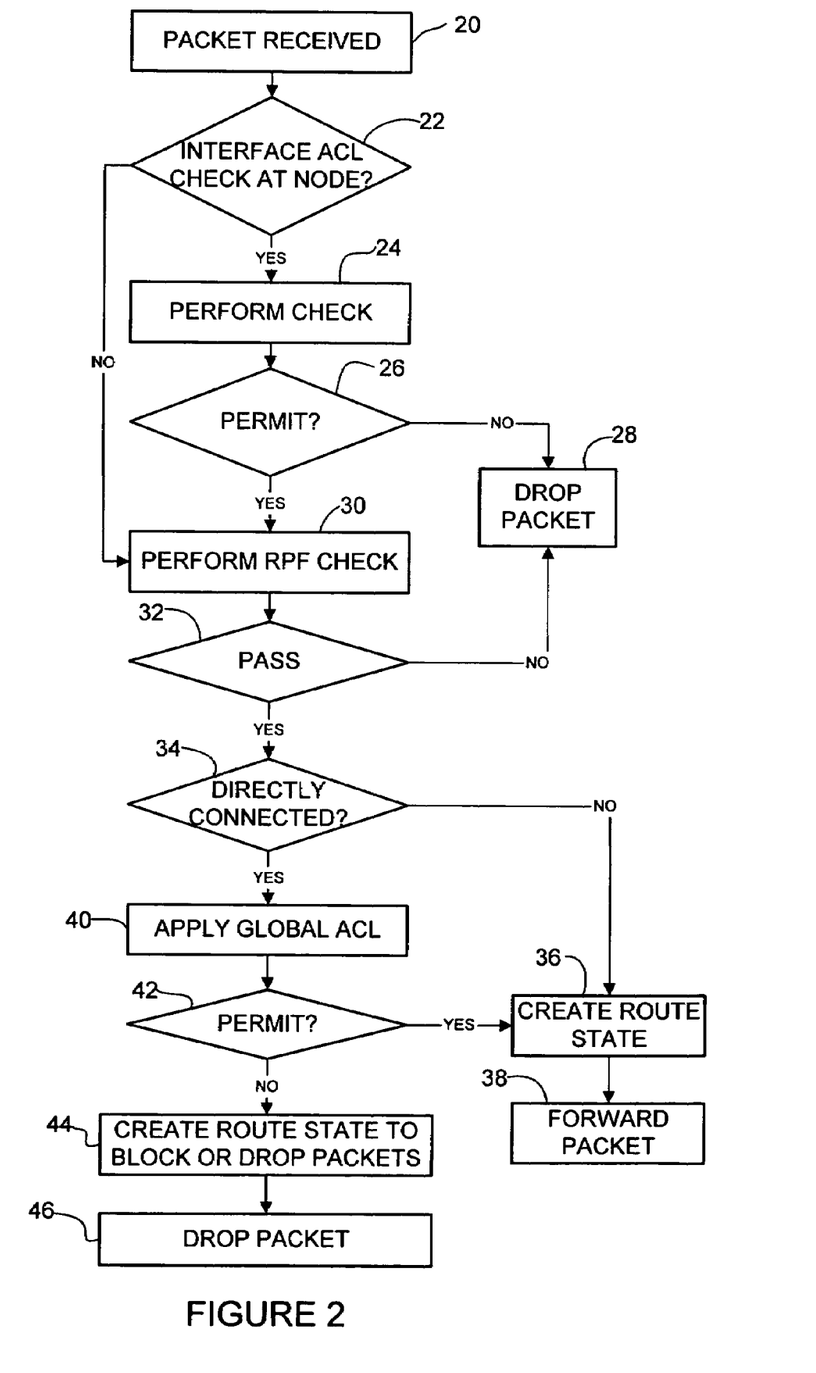
FIG. 2 is a flowchart illustrating a process for filtering packets from an unauthorized source according to an embodiment of the present invention.
Figure 3:
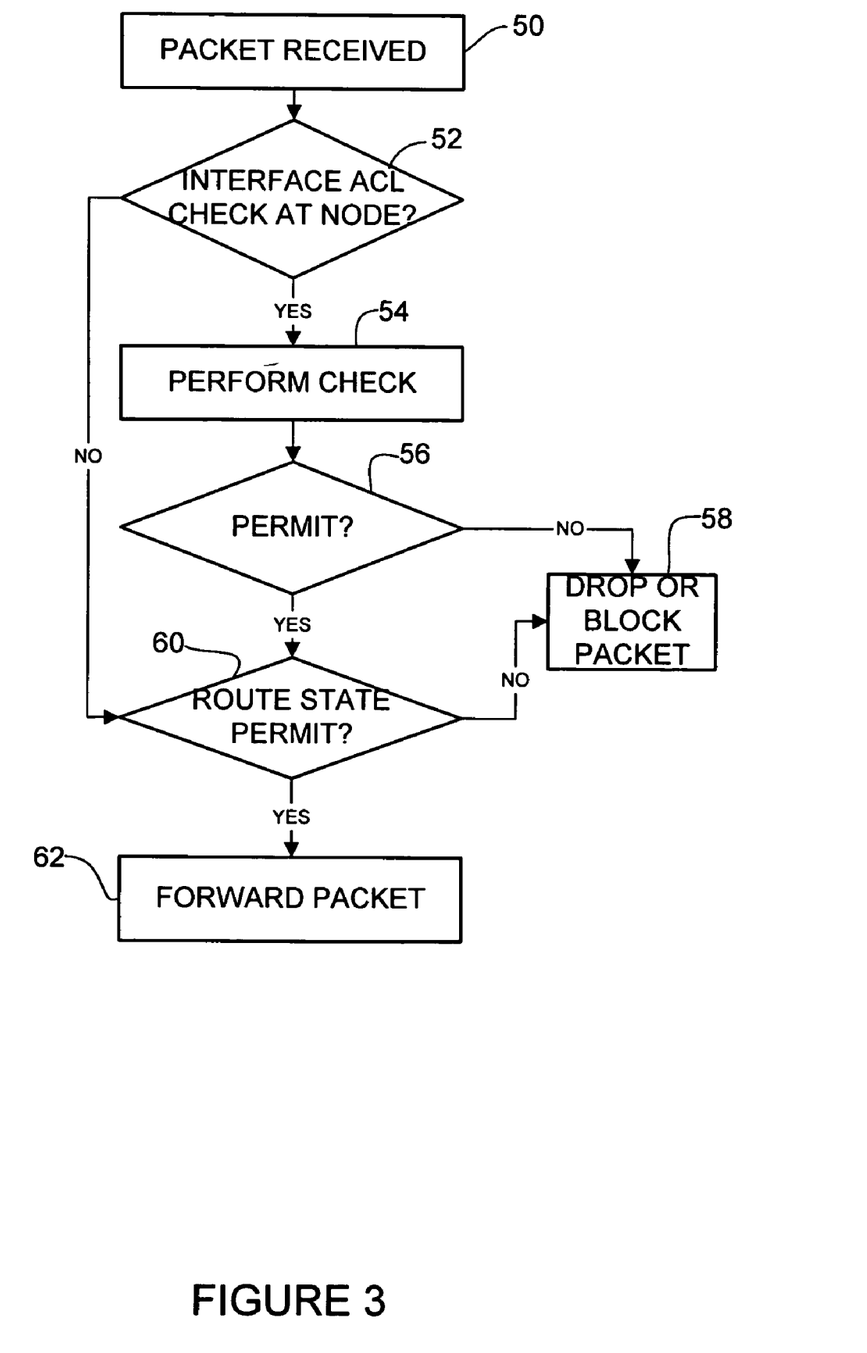
FIG. 3 is a flowchart illustrating a process for filtering subsequent packets from an unauthorized source according to an embodiment of the present invention.

The flowchart of FIGS. 2 and 3 illustrate a process of one embodiment of the present invention for filtering traffic at a first-hop router. FIG. 2 shows the sequence of steps for a first packet entering the router from a source. The packet is received at step 20. If a unicast check is located at the interface, an interface ACL check is performed (steps 22 and 24) and the packet is either permitted or dropped (steps 26 and 28). An RPF check is then performed at step 30. If the RPF check fails, then the packet is dropped as per the existing behavior (steps 32 and 28). If the RPF check passes and if the router is directly connected to the source, then global ACL is applied (steps 32, 34, and 40). If the global ACL permits, then the mroute state is created to forward the packet (steps 42, 36, and 38). If the global ACL denies, then the mroute state is created to block or drop the packet (steps 42, 44, and 46). The packet is permitted or denied according to the state created for that (S,G) in the global ACL. If the router is not directly connected to the source, mroute state is created without applying the global ACL and the packet takes the normal path (steps 34, 36, and 38).

FIG. 3 shows the sequence of steps for the rest of the packets transmitted to the router from the same source to the same group. The packet is received at step 50. If there is an interface ACL check at the interface of the router, an interface ACL check is performed (steps 52, 54, 56, and 58). If the mroute state created for the first packet is forward, the packet is forwarded (steps 60 and 62), otherwise the packet is dropped or blocked (steps 60 and 58).

The following is an example in which there are only two sources that are authorized to send traffic to particular groups (S1,G1) and (S2,G2). As shown in FIG. 1A, source nodes S1 and S2 are connected to routers R1 and R5, respectively. The global ACL is defined as follows:

permit S1 G1
permit S2 G2
deny any any

When applied on all of the routers (edge and core), this global ACL has the following results.

When S1 forwards traffic to G1, S1's first-hop router R1 subjects the first packet to the global ACL. As this packet is permitted by the global ACL, the mroute entry is created and the rest of the packets on this first-hop router are forwarded using the state created.

R2 has the same global ACL as R1. R2, however, is not directly connected to S1. When the first packet reaches the second-hop router R2, the packet is not subjected to the global ACL on this router and the mroute entry is created to forward the rest of the packets.

If another source S3 forwards traffic to G1, S3's first-hop router R7 subjects the first packet to the same global ACL (FIG. 1A). This global ACL denies the packet and an mroute state is created to block further packets coming in from S3 to G1. Rest of the packets are dropped using the mroute entry in the fast path or in hardware, depending on the capability of the router.

If S3's first hop router does not have the global ACL or has a different global ACL permitting this (S,G) packet, then when packets permitted by S3's first-hop router R7 reach the second-hop router R6, which is configured with the same global ACL, then the global ACL is not applied as S3 is not directly connected to the second-hop router R6. Thus, the mroute entry will be created and packets will be forwarded.

The examples described above refer to global ACL. It is to be understood, however, that an RP list may be used if the network is configured for sparse mode rather than dense mode, or any other suitable list may be used in place of an ACL.

Figure 4:
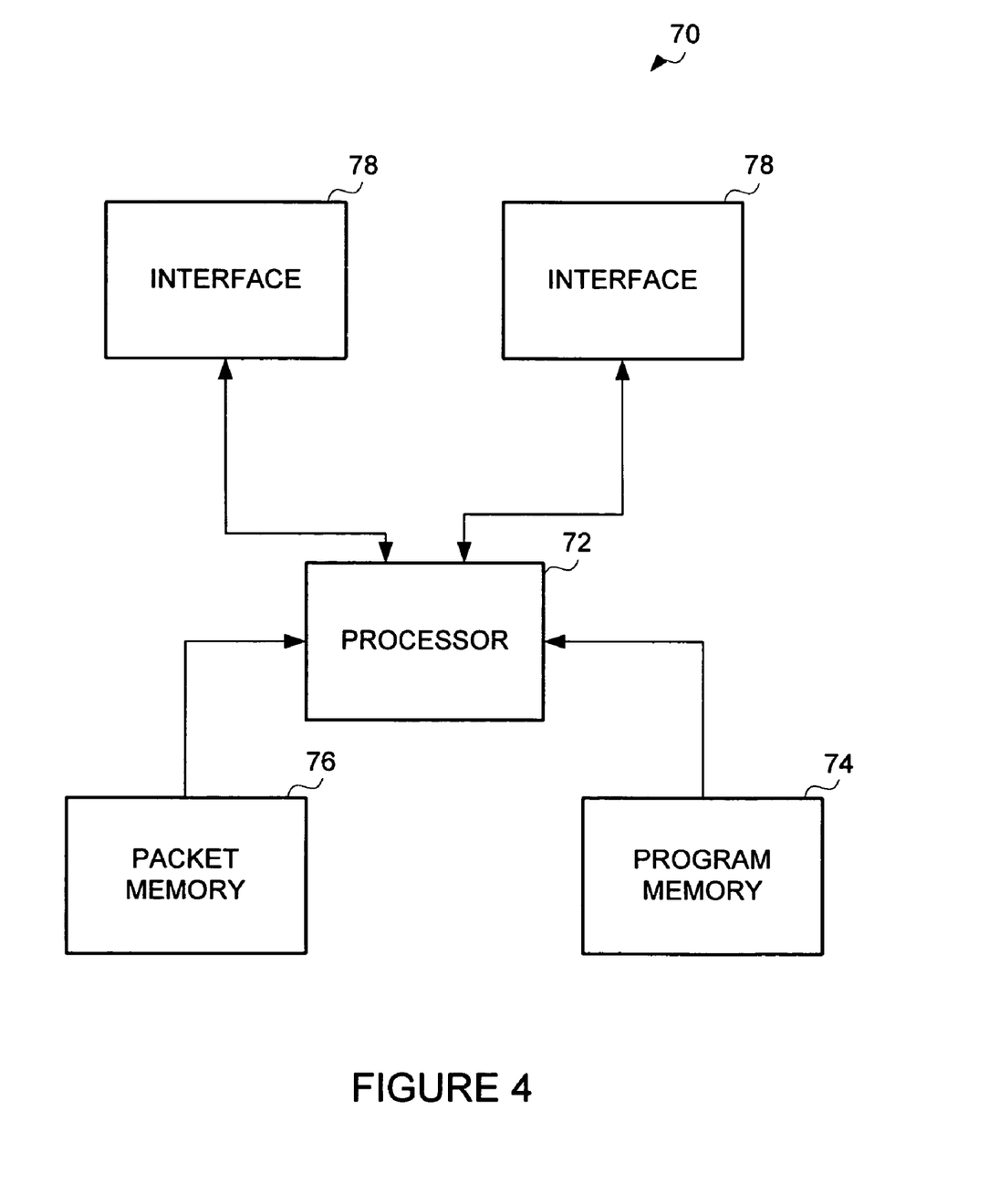
FIG. 4 illustrates a network device that may be used to implement the present invention.

FIG. 4 depicts a network device 70 that may be used to implement the method and system described above. In one embodiment, network device 70 is a programmable machine that may be implemented in hardware, software, or any combination thereof. A processor 72 executes code stored in a program memory 74. The code may control the operation of an operating system or one or more applications, for example. Program memory 74 is one example of a computer-readable non-transitory medium. Program memory 74 can be a volatile memory. Another form of computer-readable non-transitory medium storing the codes may be some type of non-volatile storage such as floppy disks, CD-ROMs, DVD-ROMs, hard disks, flash memory, etc.

Network device 70 interfaces with physical media via a plurality of network interfaces 78. The interfaces 78 are typically provided as interface cards (sometimes referred to as "linecards"). Generally, they control the sending and receiving of data packets over the network and sometimes support other peripherals used with the network device 70. As packets are processed and forwarded by network device 70, they may be stored in a packet memory 76. Packet transmission operations may occur partially or completely within one of the linecards. The interfaces 78 generally include ports appropriate for communication with the appropriate media. To implement functionality according to the present invention, linecards may incorporate processing and memory resources similar to those discussed above in connection with the network device 70 as a whole. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, and the like.

Network device 70 shown in FIG. 4 is only one example of a network device suitable for use with the invention. Other devices and systems having different configurations of subsystems may also be utilized.

As can be observed from the foregoing, the system and method described herein have many advantages. For example, the system and method prevent unwanted sources from forwarding data traffic into the network at the first-hop router and achieve this with minor changes to existing code and little configuration. Furthermore, it inter-operates seamlessly with PIM and can be enabled in sparse mode or dense mode networks or networks supporting SSM or bi-directional mode. The system and method can be easily deployed in networks without affecting the current functionality and inter-operates with other routers that do not have support for the system. It helps to control multicast sources in tightly controlled networks which require blocking of unwanted sources from forwarding multicast data traffic into the network. When combined with authentication and policy server from which the ACLs can be derived and configured, the method and system are very scalable and adapt dynamically to forward multicast data traffic from new eligible sources.

The system and method also decouple the unicast and multicast ACEs and apply them using different ACLs. With global ACL, a router has a single ACL for multicast and the same ACL can be effectively applied on all of the routers in the network. With conventional interface ACL, which may have both unicast and multicast ACEs, if some multicast ACEs (Access Control Entry) need to be applied across a network which has hundreds of routers and thousands of interfaces spread across the network, then multiple ACLs that are applied on the interfaces on different routers across the network need to be modified. With global ACL, only one global ACL on every router needs to be modified. If the same global ACL is applied on all of the routers, then only a single global ACL on all the routers needs to be changed.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for filtering traffic in a multicast network, said method comprising:
   receiving a multicast packet at a network device, the network device comprising a multicast routing table and a list containing nodes or interfaces authorized for transmitting multicast traffic into the network at the network device;
   determining if the network device is directly connected to a source of said multicast packet;
   only if the network device is directly connected to the source of said multicast packet, checking said list to determine if the source is an authorized source and dropping or blocking multicast packets from the source if the source is not an authorized source; and
   processing multicast packets from said source according to said multicast routing table.

2. The method of claim 1 further comprising creating a multicast forwarding state in said multicast routing table.

3. The method of claim 2 wherein creation of said multicast forwarding state is data driven.

4. The method of claim 1 wherein processing said multicast packet comprises forwarding said packet, preserving said packet, or dropping said packet.

5. The method of claim 1 wherein an address of said multicast packet comprises an (S,G) or a (*,G) address.

6. The method of claim 1 wherein said list is an Access Control List.

7. The method of claim 1 wherein said list is a Rendezvous Point list.

8. The method of claim 1 wherein determining if the network device is directly connected to the source comprises performing a Reverse Path Forwarding check.

9. The method of claim 1 further comprising creating a state with a flag set in the multicast forwarding table if said packet is blocked.

10. The method of claim 1 wherein said list is a global list applied to a plurality of routers in said multicast network.

11. The method of claim 10 further comprising updating said global list on the network device and said plurality of routers.

12. The method of claim 1 further comprising utilizing role based ACL to configure said list.

13. The method of claim 1 further comprising modifying said list based on information from a policy server.

14. A non-transitory computer-readable storage medium for filtering traffic in a multicast network with an executable program stored thereon comprising:
   code that receives a multicast packet at a network device, the network device comprising a multicast routing table and list containing nodes or interfaces authorized for transmitting multicast traffic into the network at the network device;
   code that determines if the network device is directly connected to a source of said packet;
   code that, only if the network device is directly connected to the source of said packet, checks said list to determine if the source is an authorized source and drops or blocks multicast packets from the source if the source is not an authorized source;
   code that processes packets from the source according to said multicast routing table;
   a computer-readable storage medium that stores the codes.

15. The non-transitory computer-readable medium of claim 14 further comprising code that creates a multicast forwarding state in said multicast routing table.

16. The non-transitory computer-readable storage medium of claim 14 wherein said list is an Access Control List.

17. The non-transitory computer-readable storage medium of claim 14 wherein said list is a Rendezvous Point list.

18. The non-transitory computer-readable storage medium of claim 14 wherein code that determines if the network device is directly connected to the source comprises code that performs a Reverse Path Forwarding check.

19. The non-transitory computer-readable storage medium of claim 14 wherein said list is a global list applied to a plurality of routers in said multicast network.

20. Apparatus for filtering traffic in a multicast network, said apparatus comprising:
   memory for storing a multicast routing table and a list containing nodes or interfaces authorized for transmitting multicast traffic into the network at a network device; and
   a processor operable to receive a multicast packet at the network device, determine if the network device is directly connected to a source of said multicast packet, only if the network device is directly connected to the source of said multicast packet, check said list to determine if the source is an authorized source and drop or block multicast packets from the source if the source is not an authorized source, and process said packet according to said multicast routing table.

21. The apparatus of claim 20 wherein said list is an Access Control List.

22. The apparatus of claim 20 wherein said list is a Rendezvous Point list.

23. Apparatus for filtering traffic in a multicast network, said apparatus comprising:
   means for receiving a multicast packet at a network device, the network device comprising a multicast routing table and a list containing nodes or interfaces authorized for transmitting multicast traffic into the network at the network device;
   means for determining if the network device is directly connected to a source of said multicast packet;
   means for, only if the network device is directly connected to the source of said multicast packet, checking said list to determine if the source is an authorized source and means for dropping or blocking multicast packets from the source if the source is not an authorized source; and
   means for processing multicast packets from the source according to said multicast routing table.

24. The apparatus of claim 23 wherein means for determining if the network device is directly connected to the source comprises means for performing a Reverse Path Forwarding check.

25. The apparatus of claim 23 wherein said list is a global list applied to a plurality of routers in said multicast network.

* * * * *